H. S. NEWBERRY.
MINNOW TRAP.
APPLICATION FILED MAR. 2, 1908.

951,656.

Patented Mar. 8, 1910.
2 SHEETS—SHEET 1.

WITNESSES:

INVENTOR

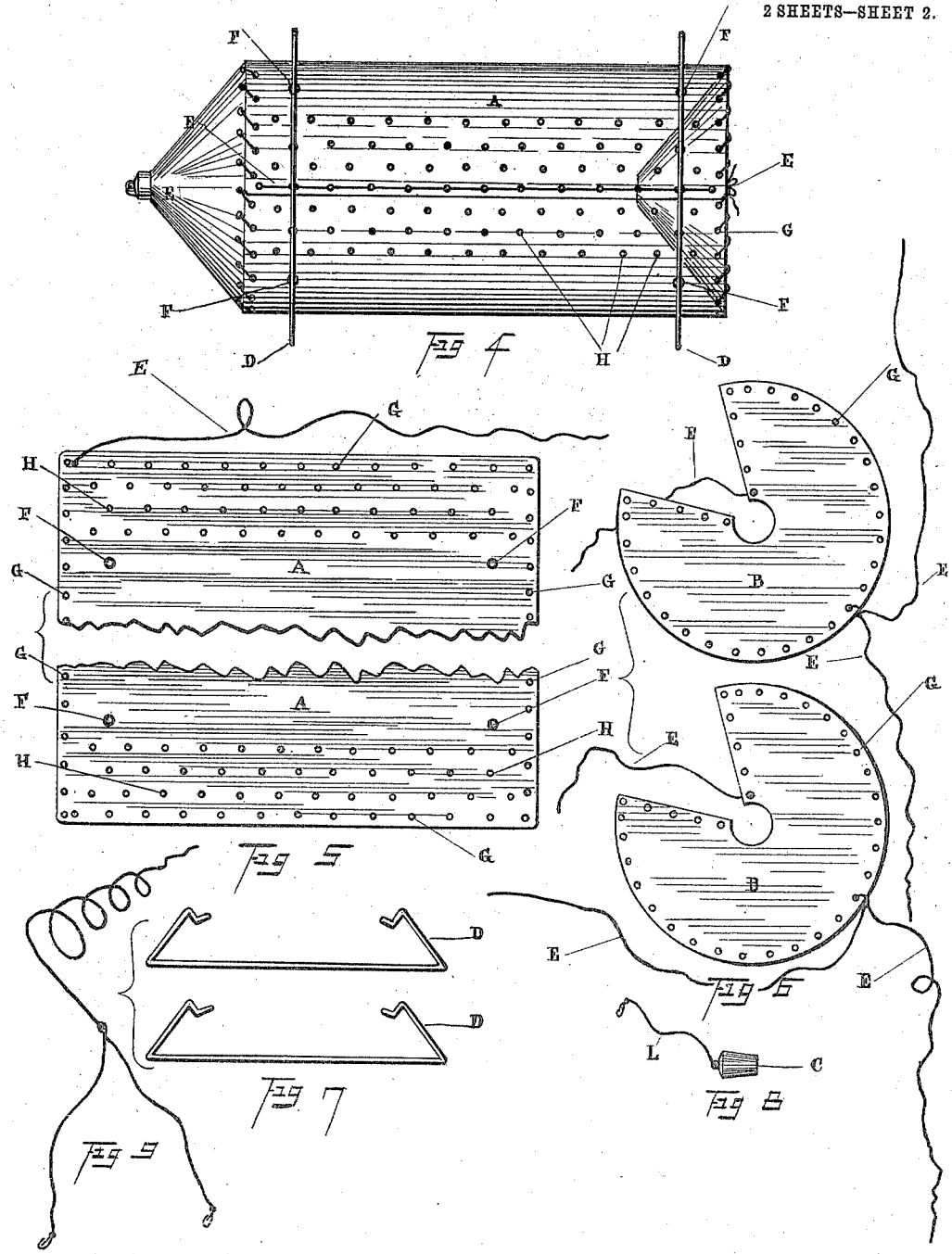

UNITED STATES PATENT OFFICE.

HENRY S. NEWBERRY, OF CLEVELAND, OHIO.

MINNOW-TRAP.

951,656.  Specification of Letters Patent. Patented Mar. 8, 1910.

Application filed March 2, 1908. Serial No. 418,797.

*To all whom it may concern:*

Be it known that I, HENRY S. NEWBERRY, a citizen of the United States, residing at Cleveland, in the county of Cuyahoga and State of Ohio, have invented a certain new and Improved Minnow-Trap, of which the following is a description.

The object of the invention is to provide a trap that is collapsible and portable and that has the transparency of glass, is light and not easily broken, the parts of which are interchangeable and reversible, and may be readily unset and packed in a small roll case that may be easily carried in hand or packed in grip or trunk.

My invention consists of a cylinder of clear transparent sheet pyralin (most commonly called celluloid) to which are laced or otherwise suitably attached interchangeable and reversible conical or funnel shaped sheet pyralin ends, one end projecting into and the other end protruding from the cylinder. The apexes of these conical ends are cut off leaving a small opening in each, one of which forms the opening to the trap, and the other the door by which the trap is emptied. The trap is provided with a door or plug to the opening in the protruding conical end. The trap is also provided with light spring wire legs to insure stability in shallow running water, as more fully hereinafter explained.

That the invention may be seen and more readily understood, reference is made to the following specification and annexed drawings forming a part thereof.

Figure 1:
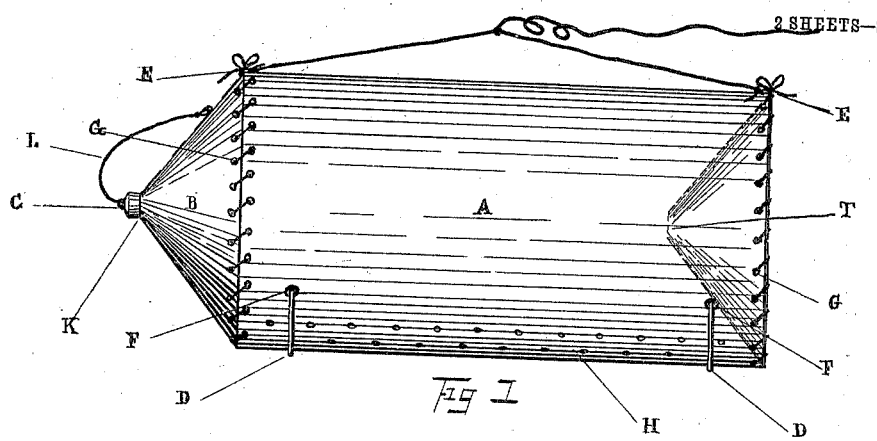
Figure 2:
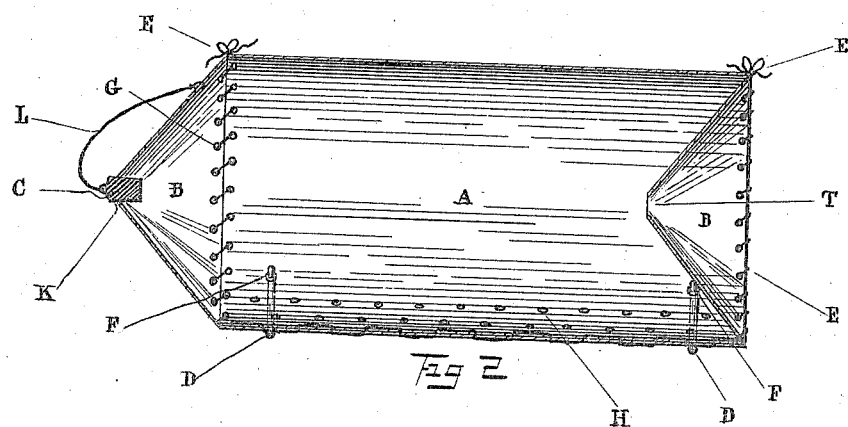
Figure 3:
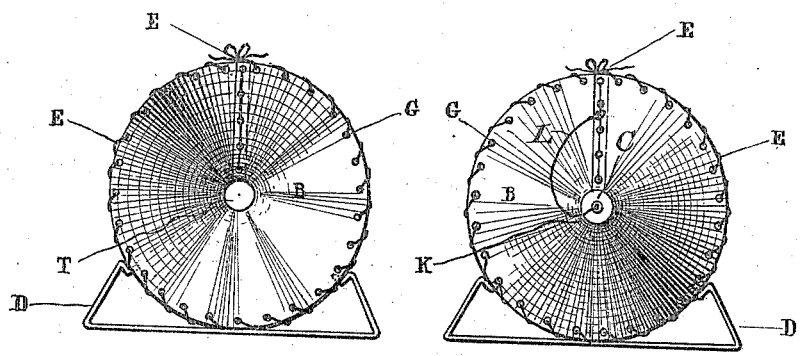

Figure 1— is a side view of the minnow trap. Fig. 2— is a sectional side view of the trap. Fig. 3— shows both trap end and door end of trap, as shown in Figs. 1 and 2. Fig. 4— is a view of the bottom of the trap showing perforations for the ingress and egress of water to facilitate respectively the setting or raising of the trap. Fig. 5— the ends of the pyralin sheet (with the center of the sheet cut out) which forms the cylinder of the trap. Fig. 6— the pyralin sheets which form the conical ends of the trap. Fig. 7— the spring wire legs of the trap. Fig. 8— the cork or plug which forms the door of the trap. Fig. 9— the string or cord used in carrying or setting the trap.

In the following specifications and accompanying drawings like letters represent like parts of the trap, and the word "pyralin" is used synonymously with the word "celluloid", and the use of one includes the other.

A the cylinder of the trap is a sheet of clear transparent pyralin with eyelet holes G at either end, by which the two ends of the sheet are laced together as shown in Fig. 4, and form the cylinder of the trap as shown in Figs. 1, 2 and 4. Eyelet holes are also placed in the sides of the sheet to admit of lacing with corresponding eyelet holes in the rim of the conical ends B as shown in Figs. 1 and 2.

B— B— are conical or funnel shaped ends of clear transparent sheet pyralin formed by lacing together the cut ends of a disk of sheet pyralin from which a radial section and a small circular section at the center have been removed, as shown in Fig. 6. When these disks are laced into funnel or cone shape a small opening is formed at the apex of each cone, one of which openings forms the trap proper, and the other the door by which the trap is emptied,—T and K respectively, as shown in Figs. 1, 2 and 3. The conical ends are identical in construction, are interchangeable, reversible, and may be used as trap end or door end of trap, as desired; they are provided with eyelet holes at their base, corresponding to the eyelet holes at the end of the cylinder which allows their being laced to the end of the cylinder as shown in Figs. 1, 2, 3 and 4. One of the conical ends is laced to the cylinder end with the cone extending into the cylinder; this is the trap end, the other conical end is laced to the opposite end of the cylinder with the cone protruding from the cylinder,—Figs. 1 and 2, and is provided with a plug or cork C which closes the hole K in the apex of the cone and forms a door to be used in emptying the trap. The plug or cork C is provided with a string or cord L (Figs. 1, 2, 3 and 8) with small snap hook at the end that may be hooked into the other lacings of the trap to prevent losing.

The bottom of the cylinder A is perforated with small holes H to allow the trap to fill readily when setting and to empty more easily when drawing from the water.

The trap is provided with light spring wire legs D as shown in Figs. 1, 2, 3, 4 and 7. These legs are constructed with a straight base, at either end of which the wire is bent inwardly at an angle of about forty-five degrees with the base, forming short arms of about three inches in length. The extreme ends of these arms are bent still farther inwardly until they are about parallel with the base. By slightly springing the legs the ends are snapped into eyelet holes in the side of the trap provided for that purpose and the legs are firmly engaged with the trap.

All laces E are attached to the several parts of the trap, as shown in Figs. 5 and 6.

The string or cord by which the trap is carried or placed in the water is provided with two small snap hooks, shown in Fig. 9, and is easily attached to the other lacing of the trap at points E—E, Fig. 1.

All of the several parts of the trap are shown as unset in Figs. 5, 6, 7, 8 and 9, and are readily rolled into a small package one tenth of the size of the trap when set up.

What I claim as my invention and desire to secure by Letters Patent is:—

A portable flexible transparent celluloid minnow trap having eyelet holes on either side of the trap and detachable spring wire legs engaging in said eyelet holes on either side of the trap, as and for the purpose set forth.

HENRY S. NEWBERRY.

Witnesses:
    HARRY BROWN,
    BURT S. CHAMBERLIN.